United States Patent [19]

Christen

[11] Patent Number: 5,036,773
[45] Date of Patent: Aug. 6, 1991

[54] ROTATABLE PRISM SWITCH FOR GUIDING A RECIPROCAL PUSHER CHAIN ALONG SEVERAL PATHS

[75] Inventor: Hanspeter Christen, Schönenberg, Switzerland

[73] Assignee: SFT AG Spontanfördertechnik, Weinfelden, Switzerland

[21] Appl. No.: 485,473

[22] Filed: Feb. 27, 1990

[30] Foreign Application Priority Data

Mar. 7, 1989 [CH] Switzerland .................. 00838/89

[51] Int. Cl.$^5$ ............................................. E01B 25/12
[52] U.S. Cl. ..................................... 104/130; 104/101; 104/162; 104/172.3; 198/738
[58] Field of Search ............... 104/35, 99, 101, 130, 104/141, 162, 172.1, 172.3; 198/468.6, 738, 744

[56] References Cited

U.S. PATENT DOCUMENTS

| | | | |
|---|---|---|---|
| 647,347 | 4/1900 | Wellman et al. | 198/738 X |
| 683,838 | 10/1901 | Best | 104/35 |
| 823,552 | 6/1906 | Schnell | 104/35 |
| 1,373,637 | 4/1921 | Riblet | 104/101 |
| 2,211,220 | 8/1940 | Verplanck | 104/35 |
| 3,583,326 | 6/1971 | Poissant | 104/35 |
| 3,635,166 | 1/1972 | Peterson | 104/101 X |
| 3,670,659 | 6/1972 | Schurch | 104/101 |
| 4,397,145 | 8/1983 | Reist | 59/78 |
| 4,474,114 | 10/1984 | Davidson | 198/744 X |
| 4,624,359 | 11/1986 | Gross | 198/468.6 X |
| 4,746,005 | 5/1988 | Bihary et al. | 104/35 X |
| 4,899,666 | 2/1990 | Meier | 104/172.3 X |

Primary Examiner—Robert J. Oberleitner
Assistant Examiner—S. Joseph Morano
Attorney, Agent, or Firm—Walter C. Farley

[57] ABSTRACT

The selective interconnection of tracks or slots coming together at a junction in a conveying system with push and pull operable conveying chains without return strands running in chain channels is accomplished by a switch constructed as a straight prism (21) mounted in a rotary manner. The prism has differently shaped chain channel portions (23', 23'') on different ones of its sides. By rotating the prism (21) about its median longitudinal axis (22), that chain channel portion is positioned in the junction, which has the channel portions shaped to obtain the desired connection between the chain channel of selected entering and exiting tracks.

14 Claims, 6 Drawing Sheets

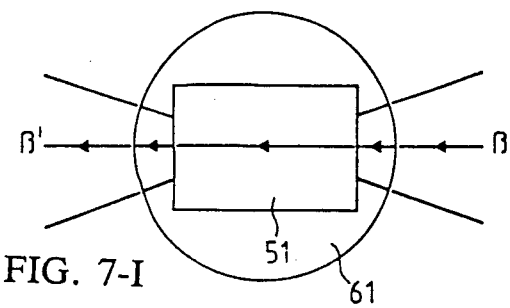
FIG. 7-I
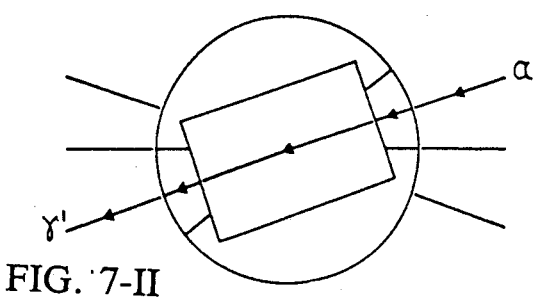
FIG. 7-II
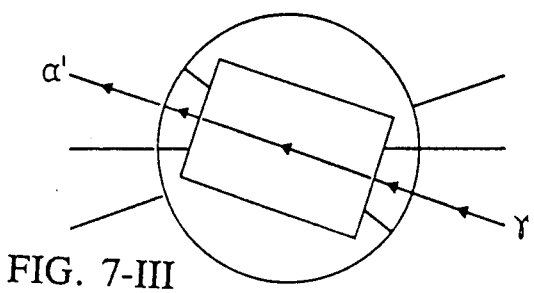
FIG. 7-III
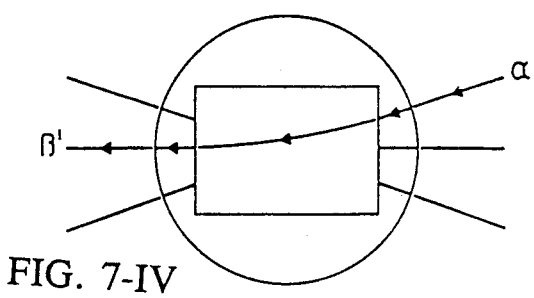
FIG. 7-IV
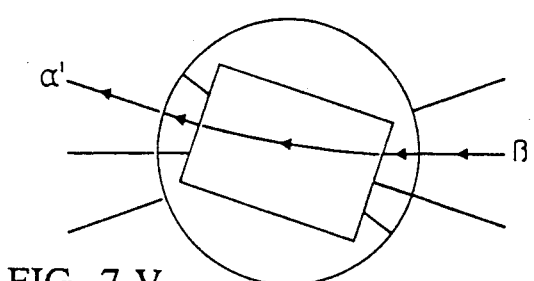
FIG. 7-V
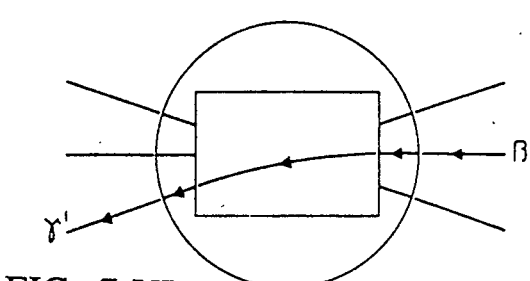
FIG. 7-VI
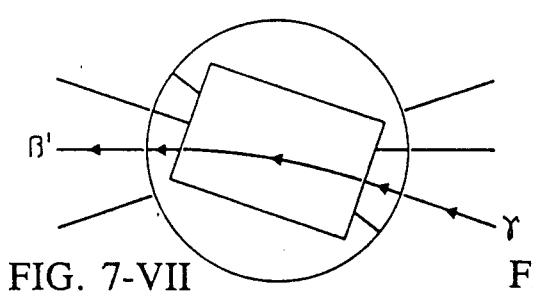
FIG. 7-VII
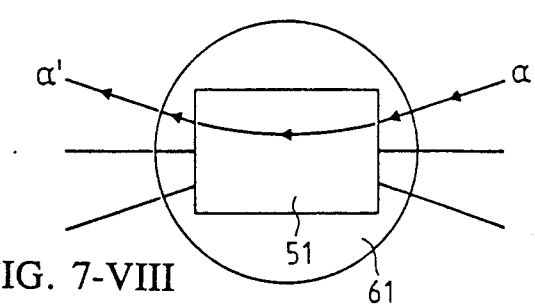
FIG. 7-VIII
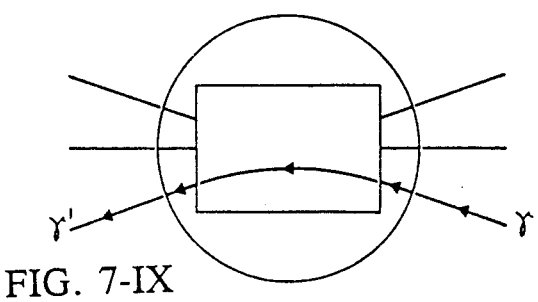
FIG. 7-IX

ROTATABLE PRISM SWITCH FOR GUIDING A RECIPROCAL PUSHER CHAIN ALONG SEVERAL PATHS The present invention relates to an apparatus for the random connection of roads or tracks in a conveying or transport system according to the preamble of the independent claim.

BACKGROUND OF THE INVENTION

The invention is to be considered in conjunction with U.S. Pat. No. 4,899,666, Meier, which shows a modular conveying system, whose tracks have correspondingly constructed chain guidance channels with push and pull operable conveying chains without a return strand moving therein. Each of the end regions of said chains is provided with a conveying means for receiving a load and for moving the same on the associated track and the other of which its guided in each case by a correspondingly constructed drive member and can be moved backwards and forwards by the same. The aforementioned discloses among other things a switch or deflector, by means of which different portions of the conveying system can be interconnected in a selectable manner.

This switch comprises a planar, circular plate, which is located in the centre of a track branch and is provided with one or more portions of chain guidance channels. Through the rotation of this plate, which to a certain extent forms a local traffic junction, one or other portion can be positioned in such a way that it links the chain channel of an entering track with the chain channel of an exiting track located on the other side of the plate.

This makes it possible in a simple efficient manner to in particular obtain Y-shaped branches. Although with such a rotary plate it is fundamentally possible to control simple crossings as well as branches, limits are relatively rapidly reached with the increasing degree of complexity of the junction and it is not possible to pass beyond these with the aforementioned concept. This will be illustrated hereinafter.

Such a switch fundamentally has two functions, namely a positive function, i.e. the random connection of two facing tracks, and a negative function, namely the interruption of the other possible connections, the latter being for traffic safety purposes. In other words, whilst one portion of the switch forms a connection between chain guidance channels of two facing tracks, it must be ensured that simultaneously another portion of the switch is not coinciding with the chain guidance channel of another track. In practice this means that as a result of the finite dimensions and minimum radii of curvature of the tracks, such a switch only permits a restricted number of potential connections.

The number of potential connections (the degree) of a junction is the product of the number of entrances and exits, said two terms being fundamentally interchangeable here and merely refer to facing tracks or roads. In practice, the aforementioned planar rotary plate makes it possible to produce junctions up to the fourth degree. Thus, a second degree junction corresponds to the aforementioned Y-branch with two entrances and one exit, whilst a fourth degree junction corresponds to a branch with two entrances and two exits. Even if possible, higher degrees would be difficult to achieve, because with the increasing number of tracks to be connected there is a rise in the number of channel portions to be provided on the plate. Bearing in mind the traffic safety principle, there must be no crossings of individual portions on the actual plate and all tracks not participating in the actual connection must be blocked by the switch.

SUMMARY OF THE INVENTION

The present invention deals with this problem and aims at providing a switch for a conveying system of the aforementioned type in which, with a constant traffic safety, much more complex and universal junctions can be obtained. This is achieved by the characterizing features of the independent claim.

The essential advantages of the invention are that a large number of additional connection variants is provided, in that the third dimension is integrated into the concept of the two-dimensional junction. Unlike in the case of the aforementioned planar rotary plate, whose limited surface is naturally only able to receive a limited number of connection portions, the present invention provides the possibility, by an appropriate rotation of the inventive prism switch, to obtain one or more additional portions from said third dimension. In addition, the average switching speed of the junction is increased, because when using the inventive prism switch for producing a new connection, as a rule a single rotation about a smaller angle is sufficient. It is also possible to obtain random track crossings, in that the portions are placed on different sides of the prism switch. Advantages and variants can be gathered from the following description.

BRIEF DESCRIPTION OF THE DRAWINGS

The invention is described in greater detail hereinafter relative to the drawings, wherein:

FIGS. 7-I through 7-IX are schematic top plan views of the switch of FIG. 6 in nine possible switching positions in a complex junction.

DESCRIPTION OF THE PREFERRED EMBODIMENT

Figure 1:
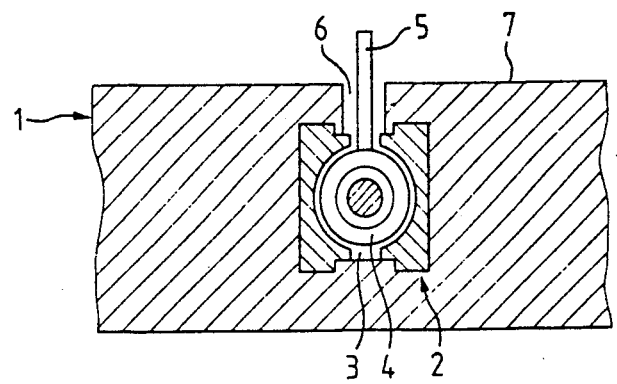
FIG. 1 is a partial sectional view of a conveying system track of the type used in the present invention.

For the better understanding of the conveying or transport system according to the invention, FIG. 1 shows a cross-section through a simplified track or road thereof. This fundamentally comprises the track body 1 and a conveying chain guide 2 embedded therein and which surrounds a conveying chain channel 3. In said conveying chain channel 3 runs a push and pull operable conveying chain 4 without a return strand (e.g. a link chain according to U.S. Pat. No. 4,397,145. One end region of the chair is guided by a not shown, fixed drive member and can be reciprocated by the latter, whilst at its other end region it has one or more connecting parts 5, which project through a continuous guide slot 6. These connecting parts 5 constitute the connection between, the link chain 4 on the one hand and a conveying means not shown in FIG. 1 (e.g. a tray provided with rollers) located on the surface 7 of track 1 on the other. The conveying means is moved backwards and forwards on the track by the chain 4 reciprocated in tenacle-like manner in chain channel 3.

Figure 2A:
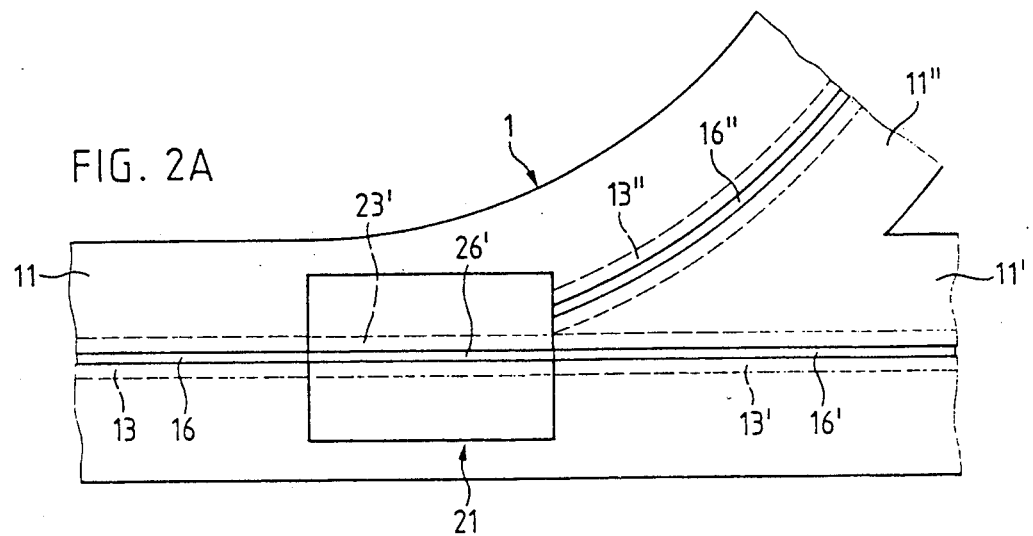
FIGS. 2A and 2B are plan views of a simple branch junction in a conveying system of the type shown in FIG. 1 and including a prism switch in accordance with the present invention.
Figure 2B:
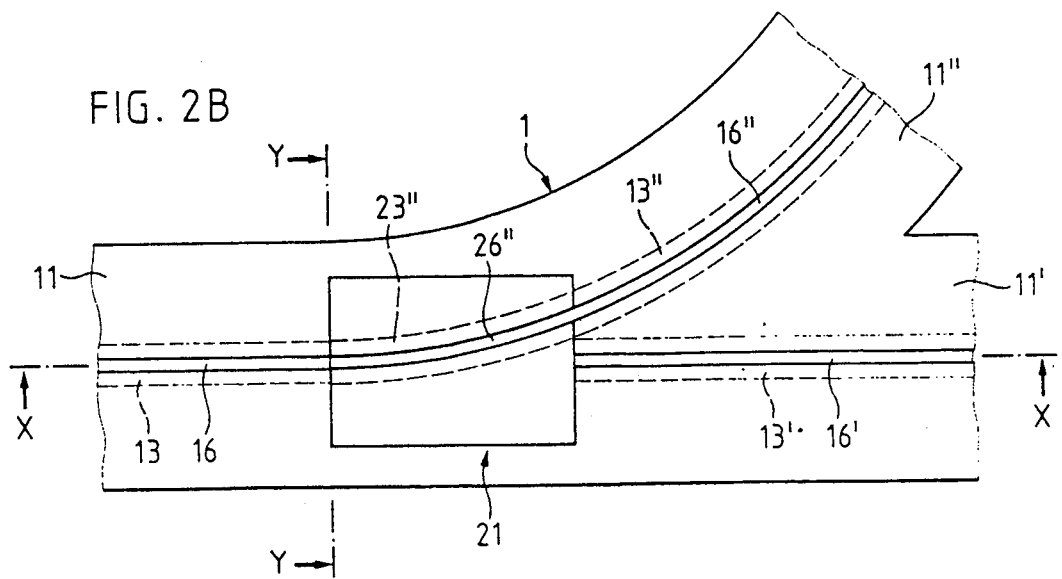

FIGS. 2A and 2B show in plan view a simple Y-shaped track branch within the scope of the aforementioned conveying system and having an inventive switch for the random switching over between the two connection possibilities (11—11' according to FIG. 2A or 11—11" according to FIG. 2B). For the fundamental representation of the invention, deliberately only a second degree junction is chosen, so as to make the drawings readily comprehensible. A rotary prism switch 21 which has a parallelepipedic construction in the present case, a selectable manner forms the connection between two entrances 11' or 11" and an exit 11 (cf. the following statements). The drawings show the conveying chain channels 13, 13', 13" with the continuous guide slots 16, 16', 16", so that it is clear that in FIG. 2A the prism switch 21 produces the connection between entrance 11' and exit 11 by means of chain channel portion 23' and the associated guide slot 26', whilst in FIG. 2B it connects entrance 11" to exit 11 by means of chain channel portion 23" and the associated guide slot 26". In both switching positions, simultaneously the entrance not participating in the connection is blocked (11" in FIG. 2A and 11' in FIG. 2B).

Figure 3:
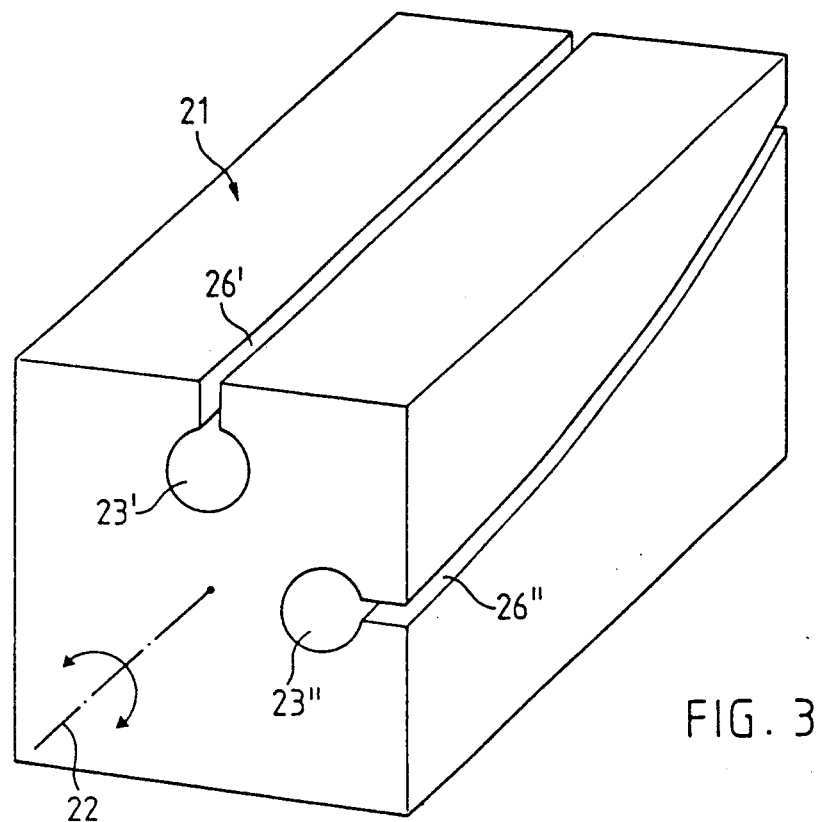
FIG. 3 is a perspective view of the prism switch used in the junction of FIGS. 2A and 2B.

In this simple construction, the inventive prism switch 21 is shaped like a parallelepiped. FIG. 3 diagrammatically and perspectively shows this prism switch and is given the same reference numerals as used in FIGS. 2A and 2B. It is clear that the prism switch can be transferred from the position shown in FIG. 2A into that shown in FIG. 2B or vice versa by a 90° rotation about its median longitudinal axis 22.

Figure 4B:
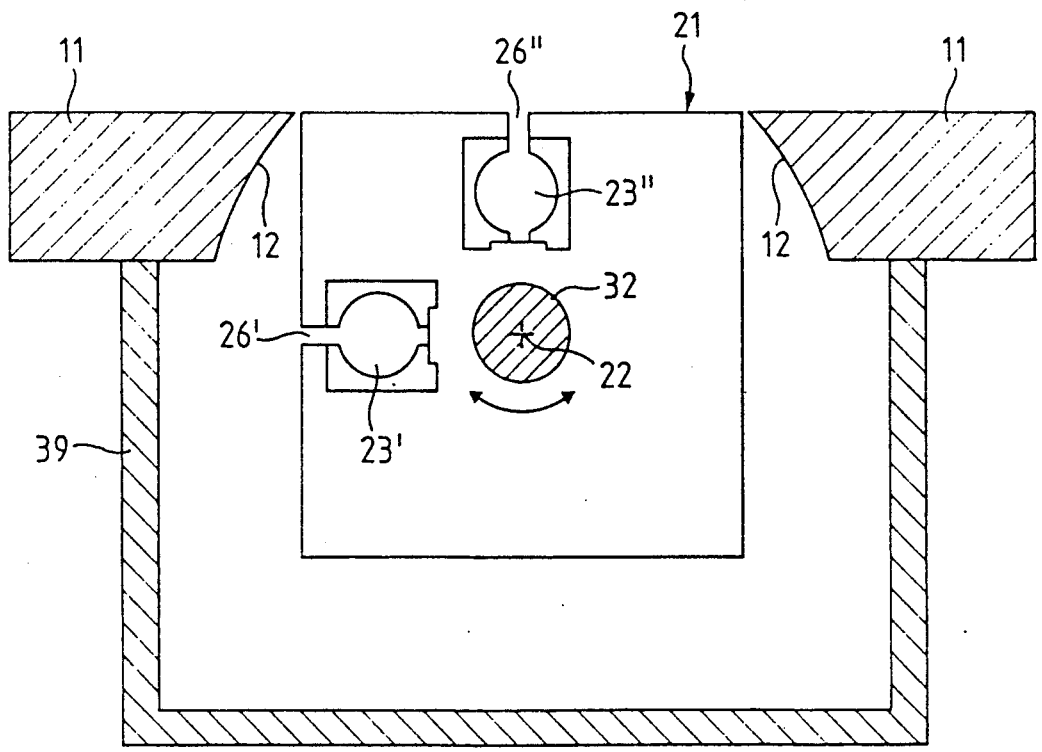
FIG. 4B is an end elevation in partial transverse section of the junction of FIGS. 2A and 2B.
Figure 4A:
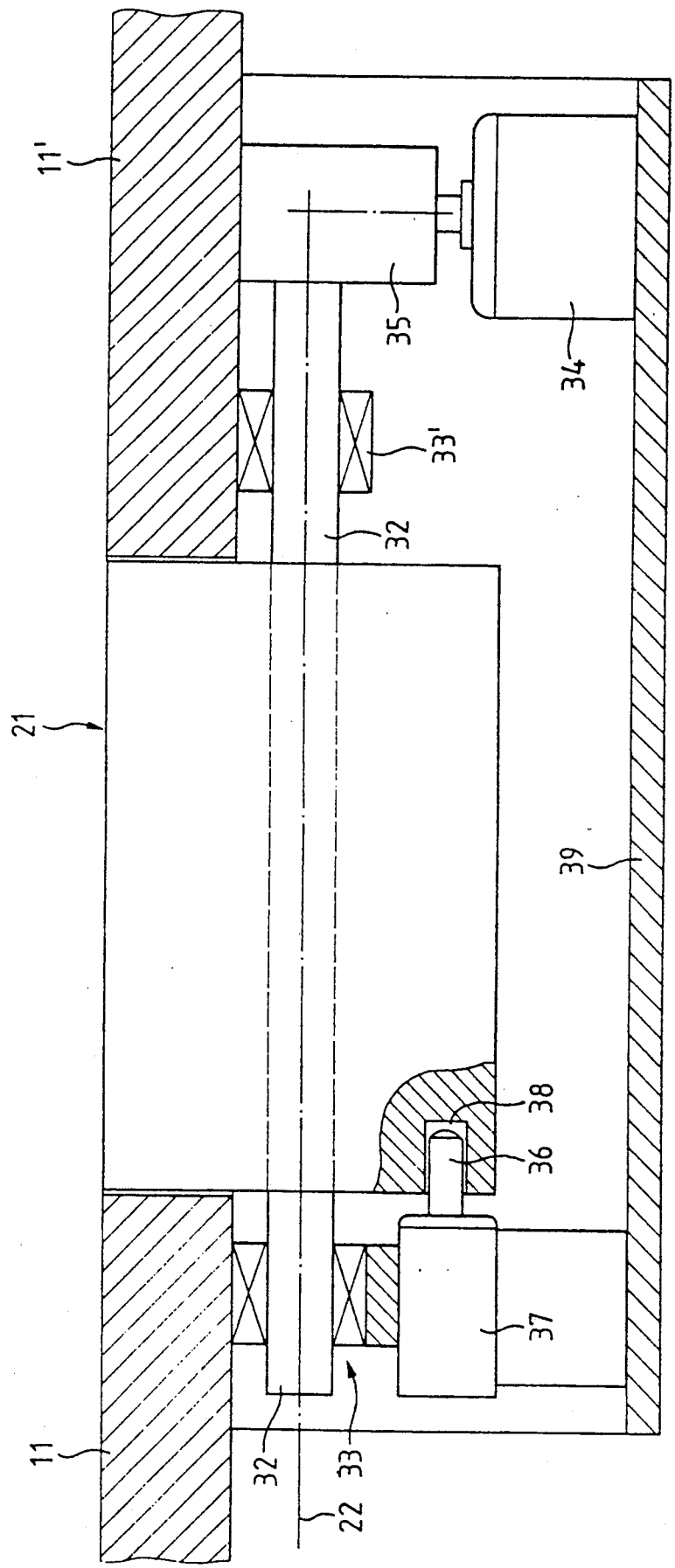
FIG. 4A is a side elevation in partial longitudinal section of the junction of FIGS. 2A and 2B.

FIGS. 4A and 4B diagrammatically show the arrangement of an inventive prism switch at a branch. FIG. 4A is a longitudinal section through the rotation axis of the switch (line X—X in FIG. 2B), whilst FIG. 2B shows a corresponding cross-section at right angles to the rotation axis (along line Y—Y in FIG. 2B). For reasons of clarity the chain channels are not shown in FIG. 4A.

The parallelepipedic prism switch 21 of FIG. 4A is positioned between the two entrances 11', 11" and the exit 11 and is mounted for rotation about its median longitudinal axis 22. For this purpose is e.g. provided a shaft 32 fixed to the parallelepiped and which preferably rests on either side of the latter in adjustable bearings 33, 33', the latter being fixed to the tracks 11, 11'. By means of a motor 34 and an interposed gear 35, shaft 32 is driven as a function of the necessary switching position of prism switch 21. A bolt 36 operable e.g. by means of an electromagnet 37 on reaching the desired switching position of switch 21, engages in a blind bore 38, so that the latter is precisely positioned and stopped until to the next switching process. No details will be given here of the control of motor 34 and bolt 36. It is also possible to manually operate the switch, as a function of the type of conveying system. The complete apparatus is preferably housed in a housing 39.

FIG. 4B shows that the track 11 is provided on its underside in the vicinity of the prism switch 21 with e.g. circular segmental recesses 12, in order to permit a rotation of the parallepipedic switch.

When the switch changes its switching position, i.e. at the instant of rotating about its axis 22, a gap is formed between the switch and the underside of surrounding track and closes again on reaching the end position. In order to eliminate the resulting accident or injury risk (e.g. jamming a finger), the motor 35 is preferably made so weak, that it will be blocked by a jammed object. It would naturally also be possible to take other safety measures, such as using a slip clutch or electronically monitoring the area round the switch, particularly the aforementioned gaps.

In place of a purely rotary movement of the switch, it would also be conceivable to lower it prior to rotation and following the latter to return it to the working level, which would reduce the aforementioned jamming risk.

The hitherto discussed drawings reveal the basic idea of the present invention, which is not, as hitherto, to link a two-dimensional junction by two-dimensional means, but also to incorporate the third dimension into the concept. It will be shown with respect to the following drawings that this makes it possible to significantly increase the number of switching variants compared with two-dimensional solutions.

Figure 5:
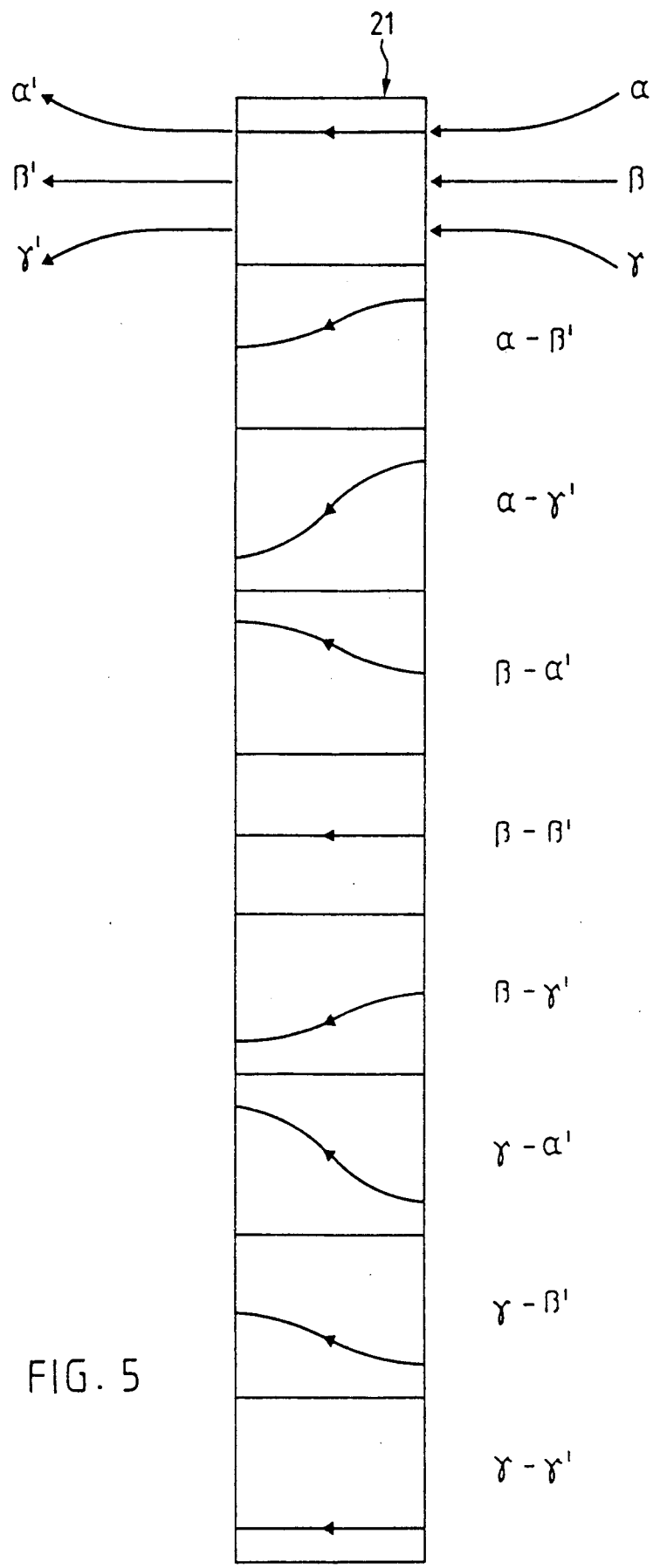
FIG. 5 is a schematic developed view of a prism switch in accordance with the invention usable in a more complex junction.

For example, FIG. 5 illustrates a ninth degree junction with three entrances $\alpha$, $\beta$ and $\gamma$, as well as three exits $\alpha'$, $\beta'$ and $\gamma'$ and here again the concept of entrances and exits are of a random nature, because obviously goods can also be conveyed in the opposite direction. An inventive prism switch is shown, which is here constructed as a straight, regular nine-sided prism and whose circumferential surface is shown in development in the drawing. Each of the nine planar sides contains a portion of a chain channel, in accordance with the nine possible switching variants given in the drawing.

Fundamentally no limits are placed on the construction of the prism switch, a nth degree junction being obtained by a straight, regular prism with n sides. However, in certain circumstances such a prism can have dimensions which either do not permit or only permit with difficulty practical realization. In the case of symmetrical junctioons, e.g. as in FIG. 5, different channel portions arranged on the prism can be transformed into one another in theory by simple geometrical operations (reflection, rotation).

Figure 6:
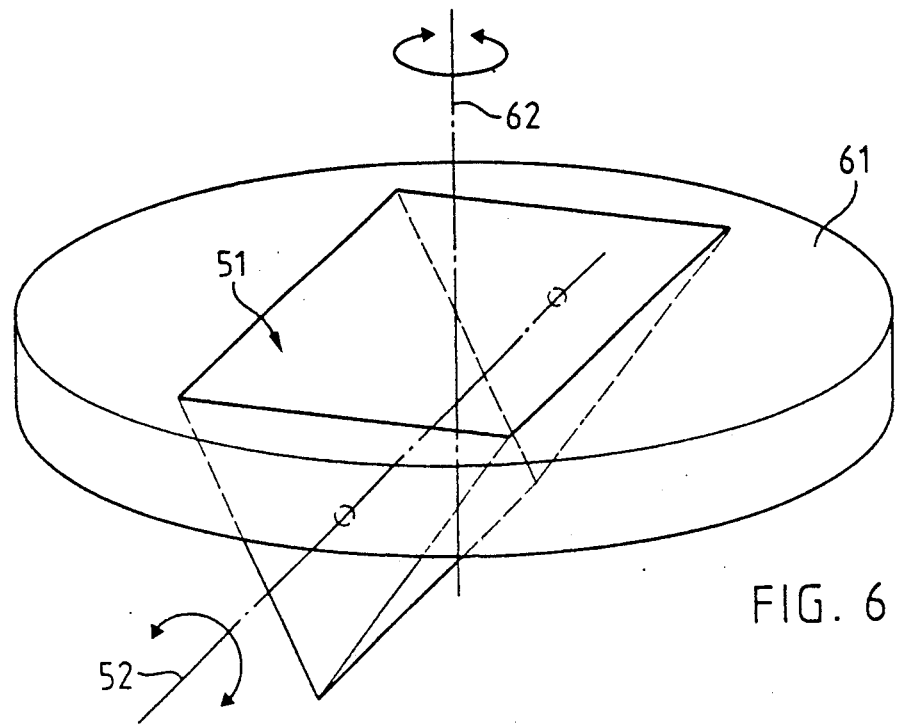
FIG. 6 is a perspective view of a further embodiment of a prism switch in accordance with the invention wherein the switch is rotatable about two axes.

This can be utilized in a more complex apparatus, as shown in FIGS. 6 and 7. the inventive prism 51, which only has three sides here, is additionally mounted in a rotary circular plate 61. The rotation axis 62 of the circular plate 61 intersects, preferably vertically, the rotation axis 52 of prism 51. This is shown in FIG. 6, but the chain channels are not shown. FIG. 7 shows the same apparatus diagrammatically and in the vicinity of a ninth degree junction, as discussed in conjunction with FIG. 5.

FIGS. 7-I through 7-IX show the nine switching positions by means of which all permutations of the connections ($\alpha$, $\beta$, $\gamma$) to ($\alpha'$, $\beta'$, $\gamma'$) can be obtained. Positions 7-I, 7-II and 7-III are transferred into one another by rotating the circular plate 61 and not the prism. For position 7-IV and starting from position 7-I, the prism is rotated by 120°. Positions 7-IV to 7-VII can be transferred into one another by rotating circular plate 61. For obtaining position 7-VIII the third prism side is rotated upwards and by rotating circular plate 61 by 180° position 7-IX is obtained.

As in the apparatus shown in FIGS. 6 and 7, positions occur, in which entrances not participating in the desired connection coincide with an intermediate channel portion of plate 61, additional measures are taken (e.g controllable barriers arranged in the entrance channel) to ensure that the rotary movement of the plate is not blocked by a conveying chain located in the intermediate portion of the plate.

Figure 8:
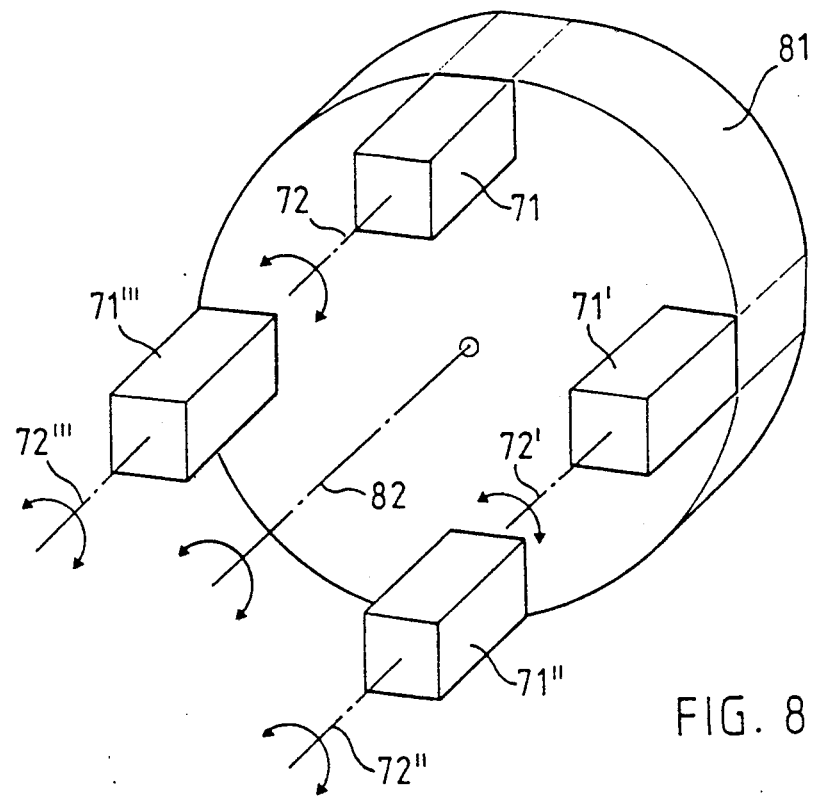
FIG. 8 is a perspective view of a still further embodiment of a switch in accordance with the invention including a rotatable prism carrier with a plurality of prism switches.

As a further variant for increasing the flexibility of the junction, an apparatus can be provided which makes it possible to put into use the most suitable of several prisms provided with different partial channels. According to FIG. 8, one embodiment involves mounting the rotation axes 72, 72′, 72″, 72‴ of these prisms 71, 71′, 71″, 71‴ on a rotary plate 81, which is in turn rotatable about a rotation axis 82.

Obviously the invention is not limited to the aforementioned embodiments. In particular the entrances and exits need not necessarily enter and exit on the base surfaces of the prism. The entrances and/or exits can also be at right angles to the median longitudinal axis of the prism. This makes it possible to obtain junctions which, unlike the branches shown in the drawings, can be considered as crossings or intersections. As a result of the acquired third dimension, it is also conceivable to have sloping or vertically directed tracks (similar to a lift), which cooperate with the horizontal tracks in such a way that a specific product is supplied by one track, deposited in the vicinity of the junction and is then conveyed on by the other track after switching over the prism switch.

I claim:

1. In a conveying system of the type having means defining a load-bearing surface, a plurality of elongated slots in the surface defining paths along which loads can be driven, a plurality of chain channels communicating with the slots and spaced from the surface, conveying chains extending into the chain channels, and drive means for pushing and pulling the conveying chains, each said chain being coupled at one end to a drive means and having means extending through the slot and coupling to a load riding on said surface, the improvement comprising a switching apparatus for selectively interconnecting pairs of a plurality of said slots and chain channels terminating at a junction location comprising means defining an opening in said load-bearing surface at said junction location;
a switching body in the shape of a prism having a plurality of side surfaces and a central axis;
means mounting said body for rotation about said central axis so that said side surfaces individually and selectively can be positioned in said opening in substantial alignment with the adjacent load-bearing surface; and
means in first and second surfaces of said body defining further slot and chain channels, said further slots and chain channels in said first and second surfaces being shaped to follow paths interconnecting said slots and chain channels terminating at said junction location, said further slots and chain channels in said first surface of said body being shaped to follow paths different from said further slots and chain channels in said second surface so that a different pair of said slots and chain channels is interconnected by the paths on said first surface from the paths on said second surface.

2. An apparatus according to claim 1 wherein said means mounting said body for rotation includes a shaft extending along said central axis and a drive motor coupled to said shaft for rotating said body.

3. An apparatus according to claim 2 and including means for precisely positioning and holding said body in each rotary position in which one of said side surfaces is positioned in said opening.

4. An apparatus according to claim 3 wherein said means for positioning includes means defining bores in an end of said body and a retractable and extendable bolt means for controllably engaging one of said bores in each said rotary position.

5. An apparatus according to claim 4 and further including means for rotating said body about an axis substantially perpendicular to one said side surfaces positioned in said opening.

6. An apparatus according to claim 5 wherein said means for rotating comprises a circular plate in said load bearing surface and means for selectively rotating said plate about an axis perpendicular to said load bearing surface, said means mounting said body for rotation about said central axis being carried by said rotatable circular plate.

7. An apparatus according to claim 4 and further comprising a rotatable prism carrier rotatable about an axis generally parallel with said support surface, said prism carrier having a plurality of prism bodies mounted thereon, each said prism body being rotatable about its own axis relative to said prism carrier.

8. An apparatus according to claim 7 wherein said axes of said prism bodies are substantially parallel with the axis of rotation of said prism carrier.

9. An apparatus according to claim 1 and including means for precisely positioning and holding said body in each rotary position in which one of said side surfaces is positioned in said opening.

10. An apparatus according to claim 9 wherein said means for positioning includes means defining bores in an end of said body and a retractable and extendable bolt means for controllably engaging one of said bores in each said rotary position.

11. An apparatus according to claim 1 and further including means for rotating said body about an axis substantially perpendicular to one of said side surfaces positioned in said opening.

12. An apparatus according to claim 11 wherein said means for rotating comprises a circular plate in said load bearing surface and means for selectively rotating said plate about an axis perpendicular to said load bearing surface, said means mounting said body for rotation about said central axis being carried by said rotatable circular plate.

13. An apparatus according to claim 1 and further comprising a rotatable prism carrier rotatable about an axis generally parallel with said support surface, said prism carrier having a plurality of prism bodies mounted thereon, each said prism body being rotatable about its own axis relative to said prism carrier.

14. An apparatus according to claim 13 wherein said axes of said prism bodies are substantially parallel with the axis of rotation of said prism carrier.

* * * * *